(12) United States Patent
Lan et al.

(10) Patent No.: US 9,701,340 B1
(45) Date of Patent: Jul. 11, 2017

(54) AUTOMATED INTERVENTION TO MODIFY DRIVING BEHAVIORS

(71) Applicant: International Business Machines Corporation, Armonk, NY (US)

(72) Inventors: Ci-Wei Lan, Keelung (TW); Wen Zhu Liu, Shanghai (CN); Dong Ni, Shanghai (CN); Yiping Qu, Shanghai (CN); Yu Wei Sun, Shanghai (CN); Jie Xu, Shanghai (CN); Li Yue, Shanghai (CN); Ting Ting Zhang, Ningde (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/076,819

(22) Filed: Mar. 22, 2016

(51) Int. Cl.
 *B62D 15/02* (2006.01)

(52) U.S. Cl.
 CPC .................... *B62D 15/025* (2013.01)

(58) Field of Classification Search
 CPC ..................................................... B62D 15/025
 See application file for complete search history.

(56) References Cited

U.S. PATENT DOCUMENTS

| 8,384,534 | B2 | 2/2013 | James et al. |
| 8,849,515 | B2 | 9/2014 | Moshchuk et al. |
| 2011/0251734 | A1 | 10/2011 | Schepp et al. |
| 2013/0060413 | A1* | 3/2013 | Lee ............... B62D 1/286 701/23 |

FOREIGN PATENT DOCUMENTS

JP     2012001063 A    1/2012

OTHER PUBLICATIONS

Lee et al., "Study on Active Steering Control of Vehicle for Safe Driving in Highway with GPS Information", 2012 Intelligent Vehicles Symposium, Alcalá de Henares, Spain, Jun. 3-7, 2012, pp. 554- 557, © 2012 IEEE.
Saleh et al., "Shared Steering Control Between a Driver and an Automation: Stability in the Presence of Driver Behavior Uncertainty", IEEE Transactions on Intelligent Transportation Systems, vol. 14, No. 2, Jun. 2013, pp. 974-983, Digital Object Identifier 10.1109/TITS.2013.2248363, © 2013 IEEE.

\* cited by examiner

*Primary Examiner* — Michael D Lang
(74) *Attorney, Agent, or Firm* — Aaron N. Pontikos

(57) ABSTRACT

A computer-implemented method includes receiving a data stream, the data stream including one or more driving factors. The computer-implemented method further includes comparing the one or more driving factors to one or more known driving factors to identify a driving scenario. The computer-implemented method further includes monitoring the driving scenario for a risk. Monitoring the driving scenario for a risk further includes detecting the risk. The computer-implemented method further includes generating an intervention, wherein the intervention is generated based on detecting the risk for the driving scenario. A corresponding computer system and computer program product are also disclosed.

15 Claims, 4 Drawing Sheets

AUTOMATED INTERVENTION TO MODIFY DRIVING BEHAVIORS

BACKGROUND

The present disclosure relates generally to automated interventions for modifying human behavior and in particular to automated interventions to modify driving behaviors.

Drivers often ignore traffic rules and/or are unaware of impending dangers. Accordingly, various vehicle safety technologies ("VSTs") have been developed to deter and safeguard drivers and their automobiles from an accident. For example, vehicles may be equipped with electronic stability control ("ESC"). ESC may help to avoid a crash by significantly reducing the risk of a vehicle skidding during a sudden emergency maneuver (e.g., avoiding an obstacle in the road) through the braking of individual wheels. In another example, vehicles may be equipped with intelligent speed assist ("ISA"). ISA may help to avoid speed related traffic accidents by alerting the driver when the driver exceeds the posted speed limit for a particular section of road. In yet another example, vehicles may be equipped with adaptive cruise control ("ACC"). ACC safety systems use either a radar or laser sensor setup that automatically adjusts the vehicle speed to maintain a safe distance from the vehicle ahead of it. Nevertheless, vehicle accidents continue to occur, which leaves extant challenges amenable to solution by VSTs.

SUMMARY

A computer-implemented method includes receiving a data stream, the data stream including one or more driving factors. The computer-implemented method further includes comparing the one or more driving factors to one or more known driving factors to identify a driving scenario. The computer-implemented method further includes monitoring the driving scenario for a risk. Monitoring the driving scenario for a risk further includes detecting the risk. The computer-implemented method further includes generating an intervention, wherein the intervention is generated based on detecting the risk for the driving scenario. A corresponding computer system and computer program product are also disclosed.

DETAILED DESCRIPTION

The ability to deter and safeguard drivers from engaging in risky driving behaviors has been further aided by the emergence of various reliable and cost effective VSTs. However, the inventors have observed and/or recognized that currently available VSTs may be ineffective for certain driving behaviors and unsuited for certain driving scenarios. The inventors have further observed and/or recognized that certain types of interventions are more effective for some individuals than others. For example, for some individuals, a warning light on the dash board indicating an unfastened seatbelt may prompt some drivers to fasten their seatbelt, while the same warning light may go unnoticed by other drivers. For those drivers that do not notice the warning light, an audio tone, such as "ding" or a "beep" may be more effective to prompt these drivers to fasten their seatbelt. The inventors have further observed and/or recognized that an individual may ignore certain VSTs. For example, when changing lanes, an individual may ignore the activation of a light on the side mirror of their vehicle indicating it is unsafe to change lanes due to the presence of another vehicle in the lane. The inventors have observed and/or recognized that an improvement in the intervention of risky driving behaviors for various driving scenarios (e.g., lane changing, passing a vehicle, fatigue, etc.) may be gained by intelligently and proactively intervening a driver's risky behavior based on the driver's personalized driving habits and surrounding context. For example, a need for an intervention for the driving scenario "passing a vehicle" may be recognized based on a driver's personalized driving habits (i.e., the driver's mannerisms associated with the driving scenario) and surrounding context (i.e., whether or not engagement in a particular driving behavior is risky). Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
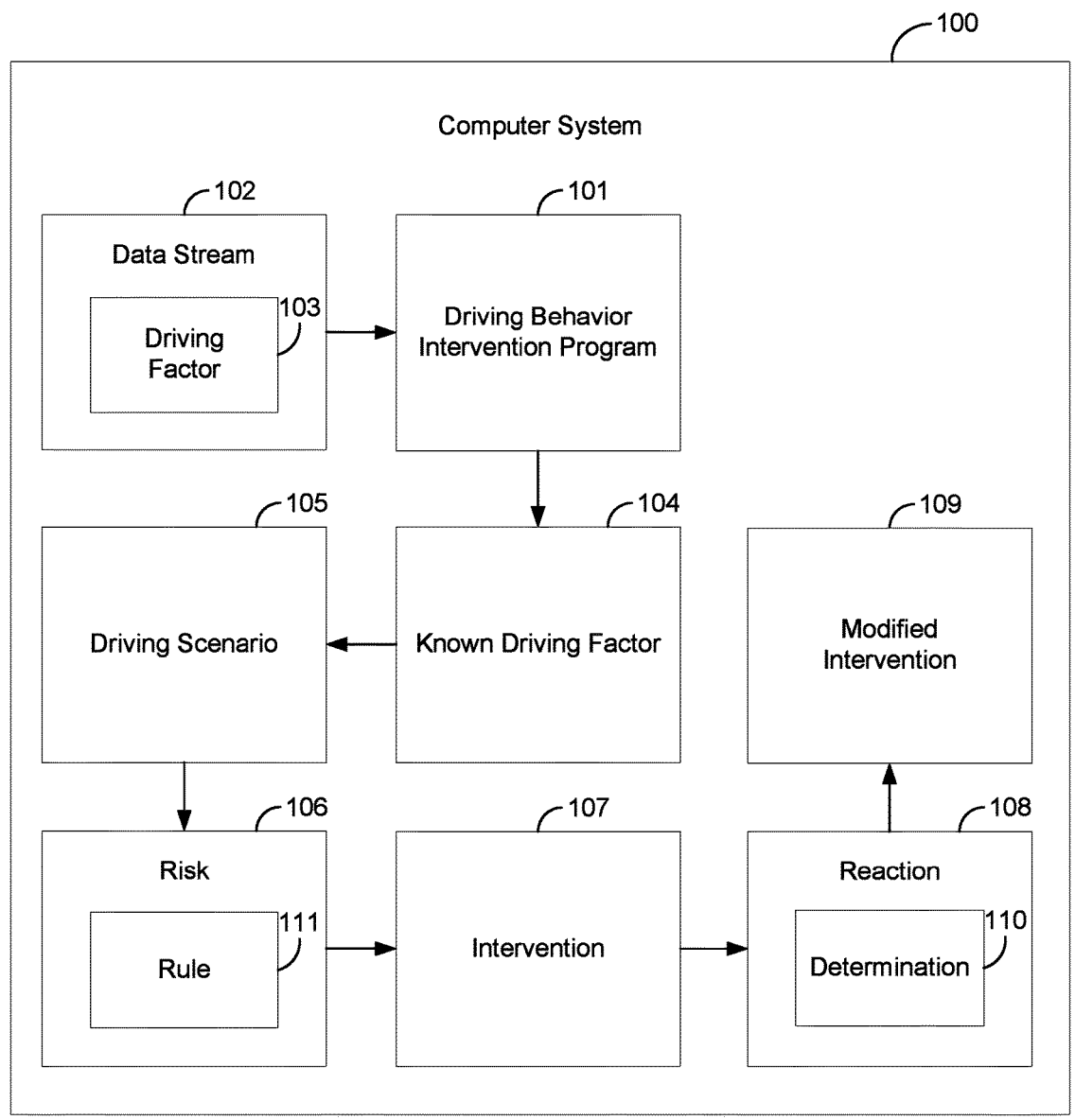
FIG. 1 is a block diagram of a computer system environment suitable for operation in accordance with at least one embodiment of the invention.

The present invention will now be described in detail with references to the Figures. FIG. 1 is a block diagram of a computer system environment suitable for operation in accordance with at least one embodiment of the invention. Within a computer system 100, a Driving Behavior Intervention ("DBI") program 101 may receive a data stream 102. A data stream 102 may be understood as the transfer of data at a steady and fast rate sufficient to support a particular application (i.e., the DBI program 101). Here, the data stream 102 may include one or more driving factors 103. The DBI program 101 may further compare the one or more driving factors 103 to one or more known driving factors 104 to identify a driving scenario 105. A driving scenario 105 may be understood as the setting or context of a driver of a vehicle (e.g., lane changing, passing or overtaking a vehicle on a two-lane highway, passing or overtaking a vehicle on a multi-lane highway, speeding, fatigue, etc.).

The DBI program 101 may further monitor the driving scenario 105 for a risk 106. Monitoring the driving scenario 105 for a risk 106 further includes detecting a risk 106. The DBI program 101 may further generate an intervention 107 based on the risk 106 for the driving scenario 105. Types of interventions 107 may include, but are not limited to: visual notifications (e.g., a signal light on the side mirror of a vehicle, an alert message displayed on a display screen of a vehicle, etc.), voice notifications (e.g., an audio warning), tactile notifications (e.g., vibration of the steering wheel, vibration of the driver's seat, etc.). The DBI program 101 may further execute the intervention 107.

In an alternative embodiment of the invention, executing the intervention 107 may further include detecting a reaction 108 to the intervention 107. Here, a reaction 108 may generally be understood as any action taken by a driver in response to the execution of an intervention 107 by the DBI program 101 for a driving scenario 105. The DBI program 101 may further terminate the intervention 107 if the risk 106 for the driving scenario 105 is minimized. Conversely, if the risk 106 for the driving scenario 105 is not minimized, the DBI program 101 may further modify the intervention 107 to yield a modified intervention 109. A modified intervention 109 may be understood as a generating a subsequently different intervention. The DBI program 101 may further execute the modified intervention 109.

In an alternative embodiment of the invention, detecting a reaction 108 to the intervention 107 may further include recording the reaction 108. The DBI program 101 may further determine whether the intervention 107 is either effective or ineffective to yield a determination 110. Here, the determination 110 is based on the driver's reaction 108 to the intervention. The DBI program 101 may further store the determination 110.

Figure 2:
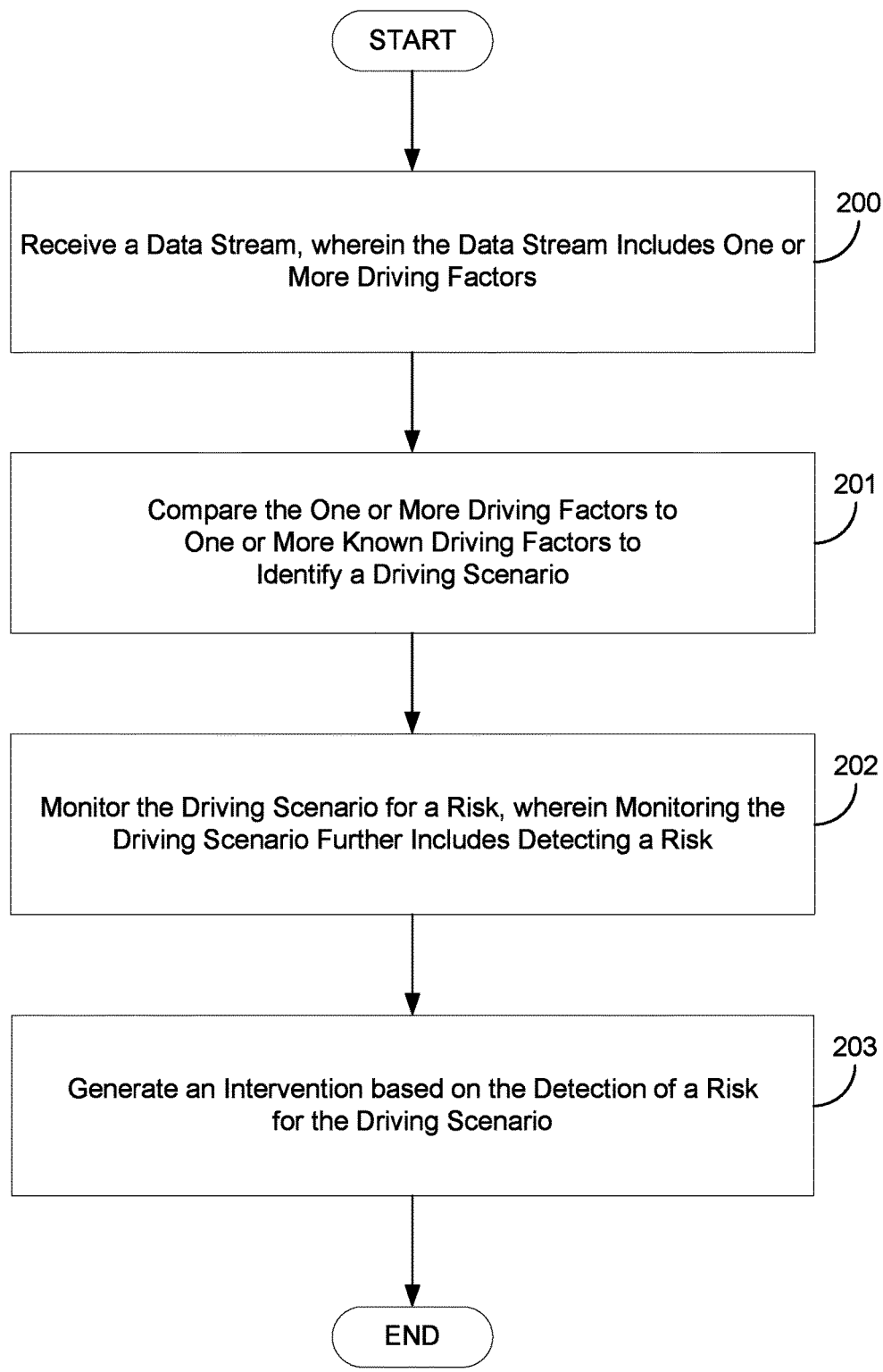
FIG. 2 is a flow chart diagram depicting operational steps for a DBI program in accordance with at least one embodiment of the invention.

FIG. 2 is a flow chart diagram depicting various steps for the DBI program 101 in accordance with at least one embodiment of the invention. According to the depicted embodiment, at step 200, the DBI program 101 may receive a data stream 102. The data stream 102 may include data from a network of physical objects or "things" embedded with electronics, software, and sensors, generically "embedded devices" (e.g., Radar, Lidar, global positioning system ("GPS"), cameras, etc.). More specifically, the data stream 102 may include one or more driving factors 103. The one or more driving factors 103 may include, but are not limited to: vehicle control factors (e.g., acceleration, braking, rotation and direction of rotation of the steering wheel, activation of turning signal indicators, speed, etc.), driver action factors (e.g., eye movement, eyesight focus, head movement and frequency of head movement, etc.), and environment factors (e.g., presence and location of other vehicles, traffic signs, road and lane markings, weather conditions, etc.).

At step 201, the DBI program 101 may compare the one or more driving factors 103 to one or more known driving factors 104 to identify a driving scenario 105. More specifically, each one or more known driving factors 104 may be associated with the one or more driving scenarios 105. The DBI program 101 may compare the one or more driving factors 103 to the one or more known driving factors 104 to identify a driving scenario 105 through the use of any generally known pattern recognition methods. In an embodiment of the invention, the DBI program 101 may identify a driving scenario 105 through the use of machine learning. In machine learning, support vector machines (SVM) are applied to analyze data and recognize patterns. An SVM is a form of computer software that includes supervised learning, wherein supervised learning is the machine learning task of analyzing data and recognizing patterns. An example of pattern recognition is classification, which attempts to assign each input value to one of a given set of classes (e.g., a blood type of "A", "B", AB", or "0"). Thus, given a training set, each marked for belonging to a class, an SVM solver intelligently builds a model that assigns new examples into one of the available classes. The DBI program 101 may use any standard SVM solvers or tools, such as a library for support vector machines ("LIBSVM").

The DBI program 101 use an SVM solver to build a model that assigns new examples (i.e., one or more driving factors 103) into one of the available classes (i.e., one or more driving scenarios 105). Here, each of the one or more driving scenarios 105 may include a training set (i.e., one or more known driving factors 104). For example, the driving scenario 105 "lane changing" may include the following known driving factors 104: frequent head movement in the direction for which the driver wants to change lanes, frequent eye sight movement in the direction for which the driver wants to change lanes, eyesight focus on the rearview mirror, presence of a dashed line between two lanes, and activation of a turning signal indicator in the direction for which the driver wants to change lanes. Similarly, the driving scenario 105 "passing or overtaking a vehicle on a two-lane highway" may include the following known driving factors 104: presence of a vehicle in front of the driver's vehicle, vehicle in front of the driver's vehicle is travelling below the posted speed limit of the road, frequent head movement in the direction for which the driver wants to pass a vehicle, frequent eye sight movement in the direction for which the driver wants to pass a vehicle, sudden increase in acceleration, presence of a dashed line and a solid line, and activation of a turning signal indicator in the direction for which the driver wants to pass a vehicle.

The DBI program 101 may compare the driving factors 103 to the known driving factors 104 for each driving scenario 105 to identify a driving scenario 105. For example, the DBI program 101 may receive the following driving factors 103: the driver is travelling on a two-lane highway, the speed limit of the current stretch of highway is fifty five miles per hour ("mph"), a vehicle is 100 feet in front of the driver's vehicle, the driver and the vehicle in front of the driver are travelling at a speed of forty five mph, the driver has activated the left turning signal indicator, the driver's eyesight is frequently directed to the left, and a sudden increase in acceleration of the vehicle. Here, the DBI program 101 may assign the driving factors 103 to the driving scenario 105 "passing or overtaking a vehicle on a two-lane highway" based on a pattern recognition between the driving factors 103 received and the known driving factors 104 associated with this driving scenario 105. Thus, the DBI program 101 may identify the driving scenario 105 "passing or overtaking a vehicle on a two-lane highway."

At step 202, the DBI program 101 may monitor the driving scenario 105 for a risk 106. Monitoring the driving scenario 105 further includes detecting a risk 106. The DBI program 101 may detect a risk 106 based on one or more rules 111 for each of the one or more driving scenarios 105. In the previous example, the DBI program 101 identified the driving scenario 105 "passing or overtaking a vehicle on a two-lane highway" (hereinafter, "overtaking"). The DBI program 101 may monitor the driving scenario 105 "overtaking" for a risk. Here, monitoring may be accomplished by receiving driving factors 103 from the "embedded devices". The DBI program 101 may further detect a risk 106 based on a set of rules 111 for the driving scenario 105 "overtaking". For example, a rule 111 may be: "Detect a risk if a solid line is observed". In another example, a rule 111 may be: "Detect a risk if a vehicle is travelling in the opposite lane of the driver". In yet another example, a rule 111 may be: "Detect a risk if a vehicle is travelling in the opposite lane within one thousand feet of the driver."

At step 203, the DBI program 101 may generate an intervention 107 based on the detection of a risk 106 for the driving scenario 105. For example, the DBI program 101 may detect a risk 106 for the driving scenario 105 "changing lanes." Upon detecting the risk 106, the DBI program 101 may generate a visual intervention, such as activation of a signal light on the side mirror of the driver's vehicle. Similarly, upon detecting the risk 106, the DBI program 101 may generate a tactile intervention, such as vibration of the steering wheel or vibration of the driver's seat.

In an embodiment of the invention, the intervention 107 may include dampening the turnability of a steering wheel.106. Here, the damping may be engaged as a driver moves the vehicle toward the risk 106 and disengaged as the driver moves the vehicle away from the risk 106. Accordingly, engagement of the damping will make it more difficult for the driver to turn the steering wheel, and thus the vehicle, in the direction of the risk 106 and easier for the driver to turn the steering wheel, and thus the vehicle, away from the direction of the risk 106.

Figure 3:
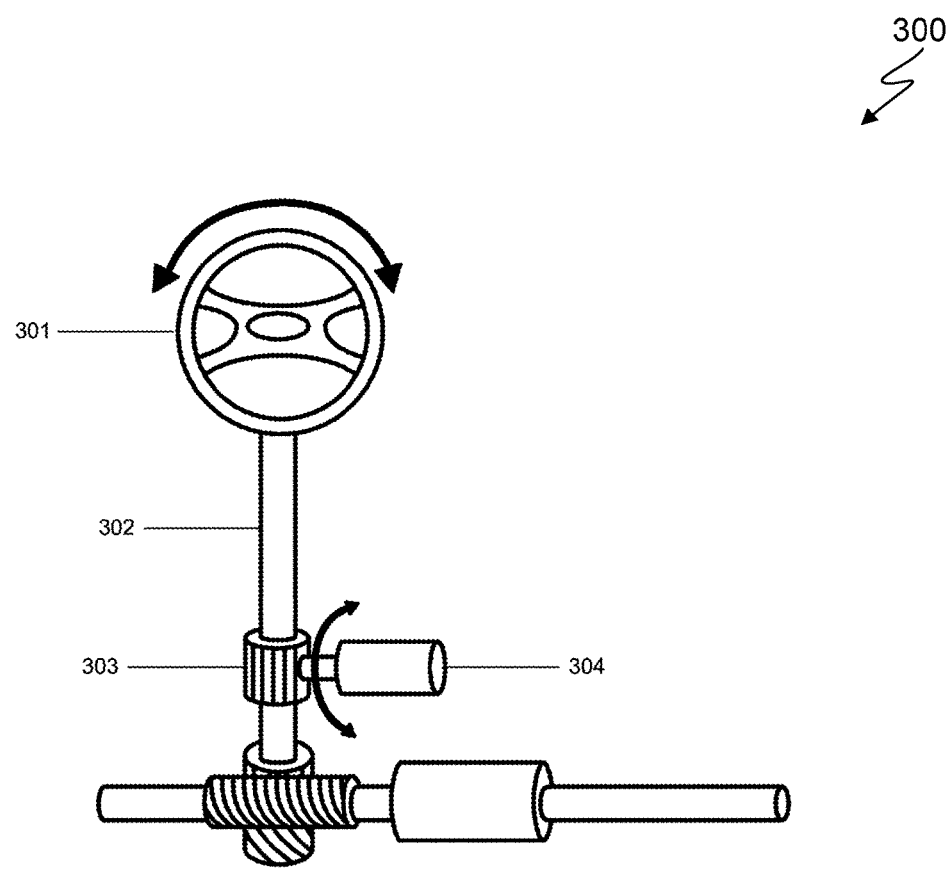
FIG. 3 is a diagram depicting an exemplary embodiment of a vehicle steering damping environment suitable for operation in accordance with at least one embodiment of the invention.

FIG. 3 is a diagram depicting an exemplary embodiment of a vehicle steering damping environment 300 suitable for operation in accordance with at least one embodiment of the invention. Within a vehicle steering damping environment 300, a rack-and-pinion steering assembly can be seen. The steering wheel 301 is operationally secured to a steering shaft 302, such that rotation of the steering wheel 301 in a first direction will cause the steering shaft 302 to rotate in a first direction and rotation of the steering wheel 301 in a second direction will cause the steering shaft 302 to rotate in a second direction. The steering shaft 302 is surrounded by a collar 303, wherein the steering shaft 302 may rotate freely about the inside of the collar 303. The collar 303 has an aperture (not shown), wherein the aperture is operationally engaged with a damping pin 304. The damping pin 304 (i.e. damper) may rotate about the aperture in a first direction, thereby causing the damping pin 304 to engage with the steering shaft 302. Engagement of the damping pin 304 with the steering shaft 302 will subsequently exert a pressure on the steering shaft 302, such that an increased amount of force will be needed to rotate the steering wheel 301. Rotation of the damping pin 304 about the aperture in a second direction will thereby cause the damping pin 304 to disengage with the steering shaft 302. Here, disengagement of the damping pin 304 with the steering shaft 302 will subsequently release the pressure exerted on the steering shaft 302, such that a decreased amount of force will be needed to rotate the steering wheel 301.

In an alternative embodiment, the vehicle steering may be dampened by means of a reduction in fluid pressure of a power steering system. For example, a vehicle may be equipped with a hydraulic system that multiplies the force applied to the steering wheel inputs to the vehicle's driving wheels (i.e., front-wheel-drive or rear-wheel-drive). Generally, the hydraulic pressure may come from a gerotor or rotary vane pump driven by the vehicle's engine. A double-acting hydraulic cylinder then applies a force to the steering gear, which in turn steers the road wheels. When a driver turns the steering wheel, the turning of the steering wheel causes the valves to control flow of hydraulic fluid to the cylinder. A reduction in fluid pressure of the power steering system will thereby cause an increase in the amount of force needed to rotate the steering wheel. On the other hand, an increase in fluid pressure of the power steering system will thereby cause a decrease in the amount of force needed to rotate the steering wheel.

In an alternative embodiment, at step 203, the DBI program 101 may further identify a reaction 108 to the intervention 107. Based on the reaction 108 to the intervention 107, the DBI program 101 may either terminate the intervention 107 if the risk 106 detected for the driving scenario 105 is minimized or modify the intervention 107 to yield a modified intervention 109, if the risk 106 detected for the driving scenario 105 is not minimized. The DBI program 101 may further execute the modified intervention 109. For example, the DBI program 101 may detect a risk 106 for the driving scenario 105 "speeding" based on the rule 111: "Detect a risk if the driver exceeds the posted speed limit (e.g., 55 mph) of the road by more than five mph". Upon detecting the risk 106, the DBI program 101 may generate a visual intervention by displaying an alert message (e.g., "Warning. You are currently speeding."). If the risk 106 is minimized (i.e., the driver reduces his speed to less than five mph over the speed limit, the DBI program 101 will terminate the alert message. Conversely, the DBI program 101 may modify the intervention 107 (i.e., the alert message) to yield a modified intervention 109 (e.g., vibration of the driver's seat) if the risk 106 detected (i.e., the driver is exceeding the posted speed limit of the road by more than five mph) is not minimized. Here, the DBI program 101 may execute the modified intervention 109 "vibration of the driver's seat". It should be appreciated that any number and combination of interventions 107 and modified interventions 109 may be generated.

In an alternative embodiment, at step 203, for each reaction 108 to the intervention 107 and modified intervention 109 for the driving scenario 105, the DBI program 101 may further record the reaction 108. For example, if the DBI program 101 generates the intervention 107 "vibration of the steering wheel" for the driving scenario 105 "changing lanes" and the driver ignores the intervention 107 and subsequently hits a vehicle traveling in the lane next to the driver, the DBI program 101 will record that the driver ignored the intervention 107. It should be appreciated that the recorded reaction 108 may be utilized by law enforcement agencies and insurance companies to help analyze the cause of an accident and identify the responsible party(s). For each reaction 108 to the intervention 107 for the driving scenario 105, the DBI program 101 may further determine whether the intervention 107 is either effective or ineffective. If the driver has a positive response to the intervention 107 (i.e., the driver minimizes the risk 106 in response to the intervention 107), the DBI program 101 may determine that the intervention 107 was effective. Conversely, if the driver has a negative response to the intervention 107 (i.e., the driver fails to minimize the risk 106 in response to the intervention 107), the DBI program 101 may determine that the intervention 107 was ineffective. The DBI program 101 may further store the determination 110 in a local database. The DBI program 101 may generate an intervention 107 based on whether the intervention 107 is either effective or ineffective.

Figure 4:
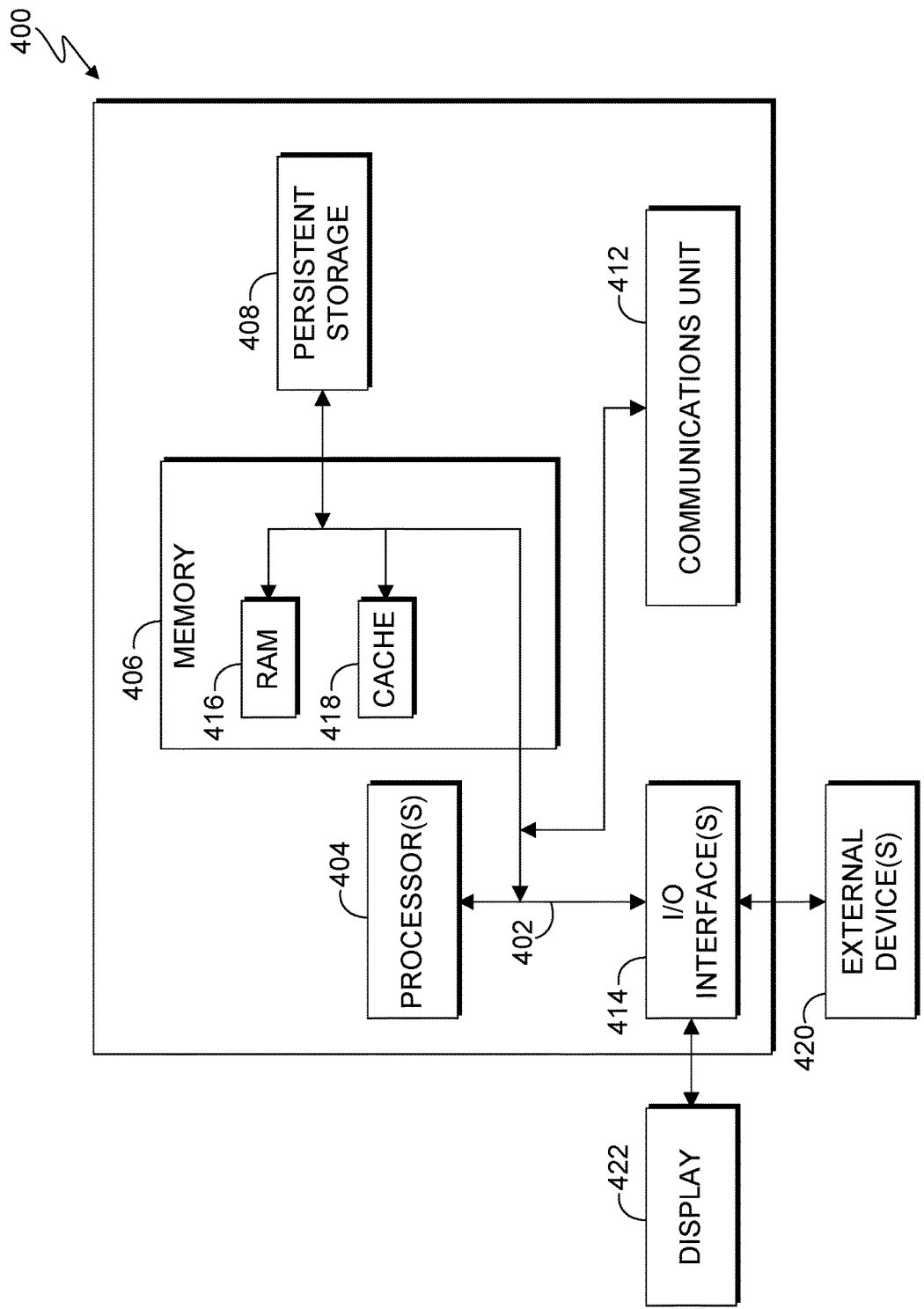
FIG. 4 is a block diagram depicting components of a computer suitable for executing the DBI program in accordance with at least one embodiment of the invention.

FIG. 4 is a block diagram depicting components of a computer 400 suitable for executing the DBI program 101, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system.

For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the DBI program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying one or more driving factors;
   comparing said one or more driving factors to one or more known driving factors to identify a driving scenario;
   detecting a risk, wherein said risk is detected based on a set of rules associated with said driving scenario;
   generating a first intervention, wherein said first intervention is generated based on said detected risk for said driving scenario;
   identifying a first reaction to said first intervention;
   determining, based on said first reaction to said first intervention, that said first intervention does not minimize said risk for said driving scenario;
   modifying said first intervention to yield a second intervention, wherein said second intervention is different than said first intervention;
   identifying a second reaction to said second intervention; and
   determining, based on said second reaction to said second intervention, that said second intervention does minimize said risk for said driving scenario.

2. The computer-implemented method of claim 1, wherein at least one of said first intervention and said second intervention includes dampening a turnability of a steering wheel.

3. The computer-implemented method of claim 2, wherein said steering wheel is operationally secured to a steering shaft, said steering shaft including a damper.

4. The computer-implemented method of claim 1, further comprising storing an effectiveness of said second intervention to minimize said risk for said driving scenario in a database.

5. The computer-implemented method of claim 1, further comprising:
   detecting a subsequent risk, wherein said subsequent risk is detected based on said set of rules associated with said driving scenario; and
   generating said second intervention, wherein said second intervention is generated based on said detected risk for said driving scenario.

6. A computer program product, the computer program product comprising one or more computer readable storage media and program instructions stored on said one or more computer readable storage media, said program instructions comprising instructions to:
   identify one or more driving factors;
   compare said one or more driving factors to one or more known driving factors to identify a driving scenario;
   detect a risk, wherein said risk is detected based on a set of rules associated with said driving scenario;
   generate a first intervention, wherein said first intervention is generated based on said detected risk for said driving scenario;
   identify a first reaction to said first intervention;
   determine, based on said first reaction to said first intervention, that said first intervention does not minimize said risk for said driving scenario;
   modify said first intervention to yield a second intervention, wherein said second intervention is different than said first intervention;
   identify a second reaction to said second intervention; and
   determine, based on said second reaction to said second intervention, that said second intervention does minimize said risk for said driving scenario.

7. The computer program product of claim 6, wherein at least one of said first intervention and said second intervention includes dampening a turnability of a steering wheel.

8. The computer program product of claim 7, wherein said steering wheel is operationally secured to a steering shaft, said steering shaft including a damper.

9. The computer program product of claim 6, further comprising instructions to store an effectiveness of said second intervention to minimize said risk for said driving scenario in a database.

10. The computer program product of claim 6, further comprising instructions to:
- detect a subsequent risk, wherein said subsequent risk is detected based on said set of rules associated with said driving scenario; and
- generate said second intervention, wherein said second intervention is generated based on said detected risk for said driving scenario.

11. A computer system, the computer system comprising:
one or more computer processors;
one or more computer readable storage media;
computer program instructions;
said computer program instructions being stored on said one or more computer readable storage media;
said computer program instructions comprising instructions to:
- identify one or more driving factors;
- compare said one or more driving factors to one or more known driving factors to identify a driving scenario;
- detect a risk, wherein said risk is detected based on a set of rules associated with said driving scenario;
generate a first intervention, wherein said first intervention is generated based on said detected risk for said driving scenario;
identify a first reaction to said first intervention;
determine, based on said first reaction to said first intervention, that said first intervention does not minimize said risk for said driving scenario;
modify said first intervention to yield a second intervention, wherein said second intervention is different than said first intervention;
identify a second reaction to said second intervention; and
determine, based on said second reaction to said second intervention, that said second intervention does minimize said risk for said driving scenario.

12. The computer system of claim 11, wherein at least one of said first intervention and said second intervention includes dampening a turnability of a steering wheel.

13. The computer system of claim 12, wherein said steering wheel is operationally secured to a steering shaft, said steering shaft including a damper.

14. The computer system of claim 11, further comprising instructions to store an effectiveness of said second intervention to minimize said risk for said driving scenario in a database.

15. The computer system of claim 11, further comprising instructions to:
- detect a subsequent risk, wherein said subsequent risk is detected based on said set of rules associated with said driving scenario; and
- generate said second intervention, wherein said second intervention is generated based on said detected risk for said driving scenario.

\* \* \* \* \*